US011887835B2

United States Patent

(12) United States Patent
Khodykin et al.

(10) Patent No.: US 11,887,835 B2
(45) Date of Patent: Jan. 30, 2024

(54) LASER-SUSTAINED PLASMA LAMPS WITH GRADED CONCENTRATION OF HYDROXYL RADICAL

(71) Applicant: KLA Corporation, Milpitas, CA (US)

(72) Inventors: Oleg Khodykin, Milpitas, CA (US); Ilya Bezel, Mountain View, CA (US)

(73) Assignee: KLA Corporation, Milpitas, CA (US)

( * ) Notice: Subject to any disclaimer, the term of this patent is extended or adjusted under 35 U.S.C. 154(b) by 50 days.

(21) Appl. No.: 17/880,472

(22) Filed: Aug. 3, 2022

(65) Prior Publication Data

US 2023/0046314 A1 Feb. 16, 2023

Related U.S. Application Data

(60) Provisional application No. 63/231,701, filed on Aug. 10, 2021.

(51) Int. Cl.
*H01J 61/30* (2006.01)
*H01J 61/02* (2006.01)

(52) U.S. Cl.
CPC .......... *H01J 61/302* (2013.01); *H01J 61/025* (2013.01)

(58) Field of Classification Search
CPC .............................. H01J 61/302; H01J 61/025
See application file for complete search history.

(56) References Cited

U.S. PATENT DOCUMENTS 7,435,982 B2 10/2008 Smith
7,786,455 B2 8/2010 Smith
7,989,786 B2 8/2011 Smith et al.
8,182,127 B2 5/2012 Yasuda et al.
8,309,943 B2 11/2012 Smith et al.
8,525,138 B2 9/2013 Smith et al.
8,921,814 B2 12/2014 Pellemans et al.
9,318,311 B2 4/2016 Chimmalgi et al.
9,390,902 B2 7/2016 Bezel et al.
2014/0293276 A1* 10/2014 Hughes .................. H05B 47/11 356/222
2015/0271905 A1* 9/2015 Oh .......................... H01J 65/00 250/432 R (Continued)

FOREIGN PATENT DOCUMENTS

JP 2891997 B1 * 5/1995 .............. H01J 61/30
JP 2891997 B1 * 5/1999 .............. H01J 61/30
JP 2891997 B1 5/1999

(Continued)

OTHER PUBLICATIONS

English Machine Translation of Japanese Patent JP2891997 (Year: 2023).*

(Continued)

*Primary Examiner* — Donald L Raleigh
(74) *Attorney, Agent, or Firm* — Suiter Swantz pc llo

(57) ABSTRACT

A plasma lamp is disclosed. The plasma lamp includes a gas containment structure configured to contain a gas and generate a plasma within the gas containment structure. The gas containment structure is formed from a glass material transparent to illumination from a pump laser and the broadband radiation emitted by the plasma. The gas containment structure includes a glass wall and the glass within the glass wall includes an OH concentration distribution that varies across a thickness of the glass wall.

18 Claims, 7 Drawing Sheets

(56) References Cited

U.S. PATENT DOCUMENTS

| | | | |
|---|---|---|---|
| 2016/0057845 | A1 | 2/2016 | Smith |
| 2021/0156869 | A1 | 5/2021 | Weinberger et al. |

FOREIGN PATENT DOCUMENTS

| | | | |
|---|---|---|---|
| JP | 2009295469 | A | 12/2009 |
| JP | 2018037277 | A | 3/2018 |

OTHER PUBLICATIONS

English Machine Translation of JP 2891997 (Year: 2023).*
Search Report and Written Opinion in International Application No. PCT/US2022/039892 dated Nov. 28, 2022, 10 pages.

* cited by examiner

LASER-SUSTAINED PLASMA LAMPS WITH GRADED CONCENTRATION OF HYDROXYL RADICAL

CROSS-REFERENCE TO RELATED APPLICATIONS

The present application claims the benefit under 35 U.S.C. § 119(e) of U.S. Provisional Patent Application Ser. No. 63/231,701, filed Aug. 10, 2021, titled LASER-SUSTAINED PLASMA LAMPS WITH GRADED CONCENTRATION OF HYDROXYL RADICAL, naming Oleg Khodykin and Ilya Bezel as inventors, which is incorporated herein by reference in the entirety.

TECHNICAL FIELD

The present invention generally relates to laser-sustained plasma (LSP) lamps, and, more particularly, to increase the longevity of the LSP lamps used in broadband plasma (BBP) illuminators.

BACKGROUND

As the demand for integrated circuits having ever-smaller device features continues to increase, the need for improved illumination sources used for inspection of these ever-shrinking devices continues to grow. One such illumination source includes a laser-sustained plasma source. Laser-sustained light sources operate by focusing laser radiation into a gas volume in order to excite the gas, such as argon or xenon, into a plasma state, which is capable of emitting light. In general, these lamps are made of fused silica glass The concentration of hydroxyl radicals (OH) in the glass determines various physical properties of glass and may dictate how the lamp degrades during operation. In order to induce absorption, OH is added in the glass recipe. This makes the glass more susceptible to creep. Thus, lamps with low-OH content degrade because of higher induced absorption, while lamps with high-OH content degrade because of creep. As such, it would be advantageous to provide solution to remedy the shortcomings of the approaches identified above.

SUMMARY

A plasma lamp is disclosed, in accordance with one or more embodiments of the present disclosure. In embodiments, the plasma lamp includes a gas containment structure configured to contain a gas and generate a plasma within the gas containment structure. In embodiments, the gas containment structure is formed from a glass material at least partially transparent to illumination from a pump laser and at least a portion of broadband radiation emitted by the plasma. In embodiments, the gas containment structure includes a glass wall, wherein the glass wall includes an OH concentration distribution that varies across a thickness of the glass wall. In embodiments, the plasma lamp is incorporated within a broadband laser-sustained plasma light source. In embodiments, the broadband laser-sustained plasma light source including the plasma lamp is incorporated within a characterization system, such as an inspection system or a metrology system.

A method of forming a plasma lamp is disclosed, in accordance with one or more embodiments of the present disclosure. In embodiments, the method includes providing a gas containment structure, the gas containment structure including a glass wall. In embodiments, the method includes treating an internal surface of the glass wall of the gas containment structure to alter an OH concentration at the internal surface such that a first OH concentration at the internal surface is greater than a second OH concentration within a bulk region of the glass wall.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure

BRIEF DESCRIPTION OF DRAWINGS

The numerous advantages of the disclosure may be better understood by those skilled in the art by reference to the accompanying figures.

DETAILED DESCRIPTION

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to a plasma lamp including a glass wall formed with a selected OH distribution across the thickness of the glass wall. Specifically, the bulk of the glass can have low-OH content (e.g., about 300 ppm or lower), protecting glass from creep, while the inner surface can have high OH content (e.g., about 600 ppm or higher), reducing surface degradation that leads to induced absorption of light typically across 214 nm, 260 nm, and other defect absorption bands. In one embodiment, the OH content may vary gradually across the thickness of the glass wall of the plasma lamp. In an alternative embodiment, the internal surface of the glass wall may have undergone a surface treatment that increases the OH content in a thin layer (e.g., 1 nm to 100 μm) near the internal surface of the glass wall. A surface treatment may include, but is not limited to, annealing the plasma lamp at elevated temperatures in presence of water vapor, or coating the lamp surface by chemical precursors.

Figure 1A:
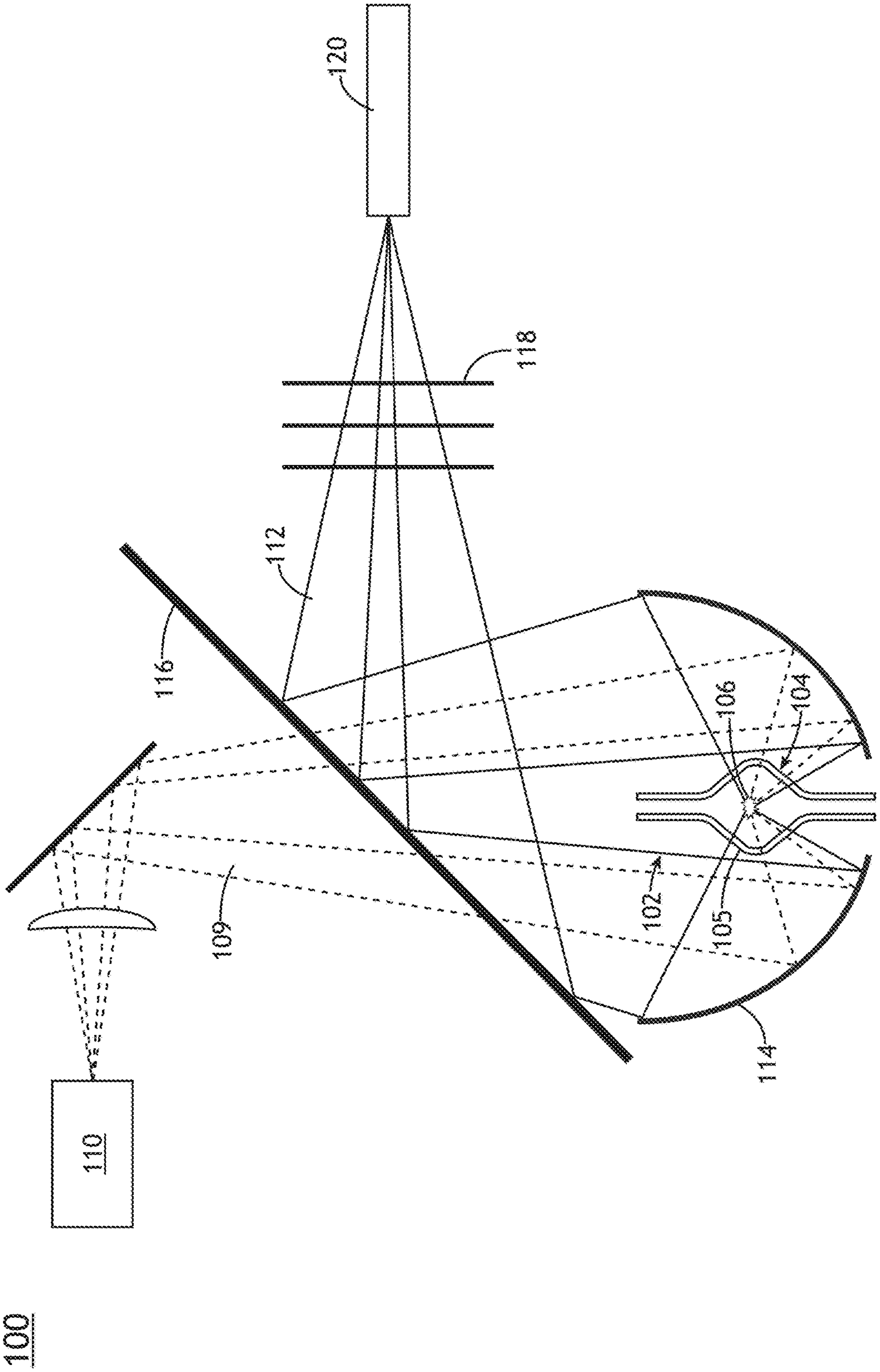
FIGS. 1A-1B illustrates schematic views of an LSP broadband light source equipped with a plasma lamp including glass walls with varying OH content, in accordance with one or more embodiments of the present disclosure.
Figure 1B:
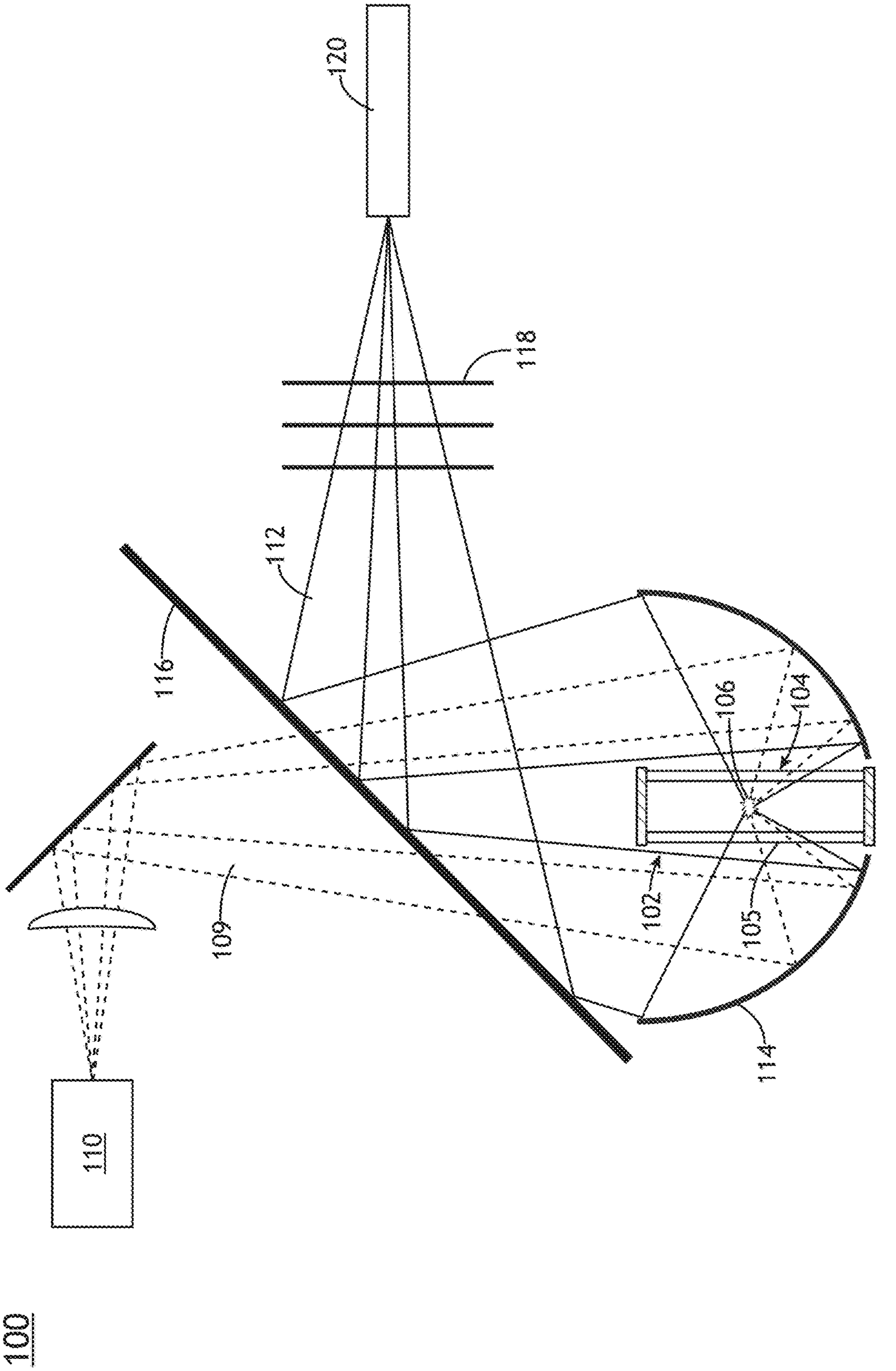

FIGS. 1A-1B illustrates schematic views of an LSP broadband light source 100, in accordance with one or more embodiments of the present disclosure. The LSP source 100 includes a plasma lamp 102. The plasma lamp 102 includes a gas containment structure 104 (e.g., plasma bulb, plasma cell, or plasma chamber) configured to contain a gas and generate a plasma 106 within the gas containment structure 104. FIG. 1A depicts the case where the plasma lamp 102 is a plasma bulb. FIG. 1B depicts the case where the plasma lamp 102 is a plasma cell. In embodiments, the gas containment structure 104 includes glass wall 105 having an OH concentration distribution that varies across a thickness of the glass wall 105. The glass wall 105 is formed from a material (e.g., fused silica) at least partially transparent to illumination 109 from pump source 110 and the broadband radiation 112 emitted by plasma 106.

The pump source 110 is configured to generate illumination 109, which acts as an optical pump, for sustaining the plasma 106 within the gas containment structure 104. For example, the pump source 110 may emit a beam of laser illumination suitable for pumping the plasma 106. In embodiments, the light collector element 114 is configured to direct a portion of the optical pump to a gas contained in the gas containment structure 104 to ignite and/or sustain the plasma 106. The pump source 110 may include any pump source known in the art suitable for igniting and/or sustaining plasma. For example, the pump source 110 may include one or more lasers (e.g., pump lasers). The pump beam may include radiation of any wavelength or wavelength range known in the art including, but not limited to, visible, IR radiation, NIR radiation, and/or UV radiation. The light collector element 114 is configured to collect a portion of broadband radiation 112 emitted from the plasma 106. The broadband radiation 112 emitted from the plasma 106 may be collected via one or more additional optics (e.g., a cold mirror 116) for use in one or more downstream applications (e.g., inspection, metrology, or lithography). The LSP light source 100 may include any number of additional optical elements such as, but not limited to, a filter 118 or a homogenizer 120 for conditioning the broadband radiation 112 prior to the one or more downstream applications. The light collector element 114 may collect one or more of visible, NUV, UV, DUV, and/or VUV radiation emitted by plasma 106 and direct the broadband light 112 to one or more downstream optical elements. For example, the light collector element 114 may deliver infrared, visible, NUV, UV, DUV, and/or VUV radiation to downstream optical elements of any optical characterization system known in the art, such as, but not limited to, an inspection tool, a metrology tool, or a lithography tool. In this regard, the broadband light 112 may be coupled to the illumination optics of an inspection tool, metrology tool, or lithography tool.

Figure 2:
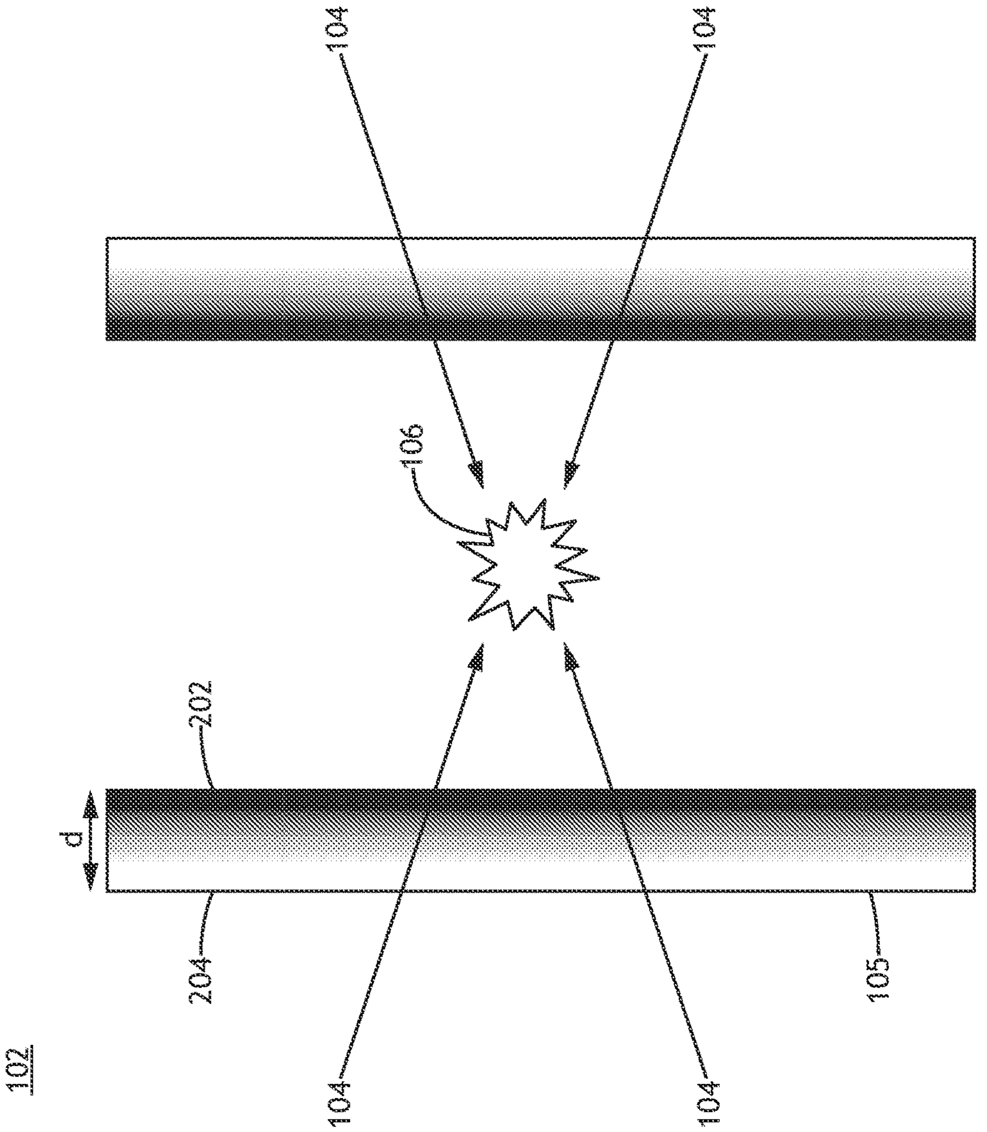
FIG. 2 illustrates a conceptual view of a portion of the plasma lamp depicting OH variation across the glass wall, in accordance with one or more embodiments of the present disclosure.

FIG. 2 illustrates a conceptual view of a portion of the plasma lamp 102 depicting OH variation across the glass wall 105, in accordance with one or more embodiments of the present disclosure. In this embodiment, the OH concentration may vary gradually from the internal surface 202 of the glass wall 105 to the external surface 204 of the glass wall 105. For example, during formation, the recipe for the fused silica glass material may be adjust such that the OH concentration at the internal surface 202 of the glass wall 105 is greater than the OH concentration at the external surface 204 of the glass wall 105, with the concentration varying gradually across the thickness d of the glass wall 105. By lowering the OH-content in the bulk of the glass, creep within the bulk may be prevented or at least mitigated. In addition, by increasing the OH content at the inner surface, surface degradation that leads to induced absorption may be eliminated or limited.

Figure 3:
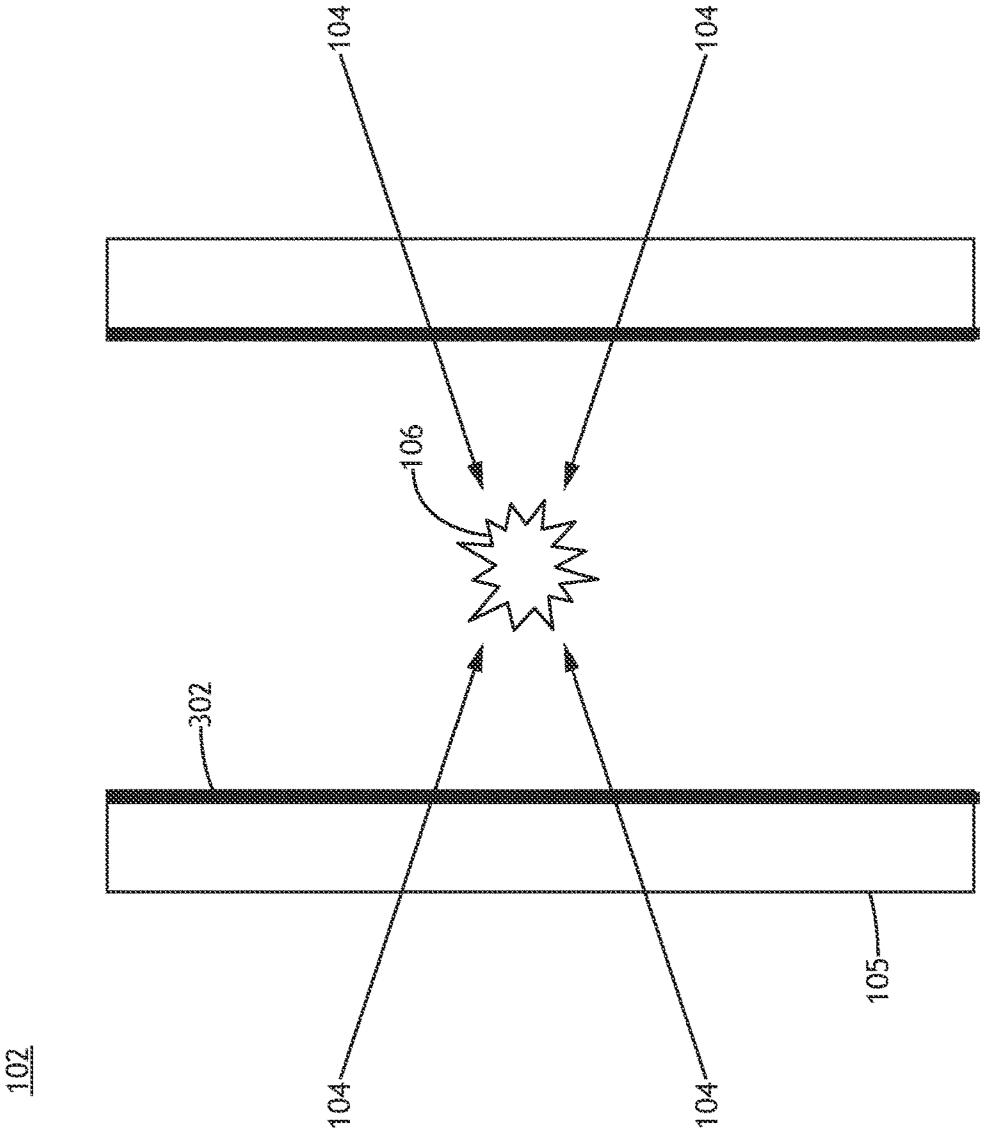
FIG. 3 illustrates a conceptual view of a portion of the plasma lamp depicting a thin layer of increased OH concentration at the inner surface of the glass wall, in accordance with one or more embodiments of the present disclosure.

FIG. 3 illustrates a conceptual view of a portion of the plasma lamp 102 depicting a thin layer 302 of increased OH concentration at the inner surface of the glass wall 105, in accordance with one or more embodiments of the present disclosure. In this embodiment, the inner surface of the glass wall 105 may undergo a surface treatment in order to increase the OH concentration within a thin layer 302 at the inner surface of the glass wall. The thickness of this thin layer 302 may range from 1 nm to 100 μm. For example, the plasma lamp 102 may be formed with a low-OH glass material (e.g., low OH fused silica). Then, the low-OH glass may undergo a surface treatment that impregnates the inner surface of the glass wall 105 with OH and/or $H_2$. It is noted that the impregnation of $H_2$ into the low-OH glass will result in OH formation as $H_2$ reacts with oxygen within the glass upon irradiation by the light from the plasma.

Referring generally to FIGS. 1-3, the plasma lamp 102 may contain any selected gas (e.g., argon, xenon, mercury, or the like) known in the art suitable for generating a plasma upon absorption of pump illumination. In embodiments, the focusing of pump illumination 109 from the pump source 110 into the volume of gas causes energy to be absorbed by the gas or plasma (e.g., through one or more selected absorption lines) within the gas containment structure, thereby "pumping" the gas species in order to generate and/or sustain a plasma 106. The source 100 may be utilized to initiate and/or sustain the plasma 106 in a variety of gas environments. In embodiments, the gas used to initiate and/or maintain a plasma 106 may include an inert gas (e.g., noble gas or non-noble gas) or a non-inert gas (e.g., mercury). In embodiments, the gas used to initiate and/or maintain a plasma 106 may include a mixture of gases (e.g., mixture of inert gases, mixture of inert gas with non-inert gas, or a mixture of non-inert gases). For example, gases suitable for implementation in the source 100 may include, but are not limited, to Xe, Ar, Ne, Kr, He, $N_2$, $H_2O$, $O_2$, $H_2$, $D_2$, $F_2$, $CH_4$, $CF_6$, one or more metal halides, a halogen, Hg, Cd, Zn, Sn, Ga, Fe, Li, Na, Ar:Xe, ArHg, KrHg, XeHg, and any mixture thereof. The present disclosure should be interpreted to extend to any gas suitable for sustaining a plasma within a plasma lamp.

The pump source 110 may include any laser system known in the art capable of serving as an optical pump for sustaining a plasma. For instance, the pump source 110 may include any laser system known in the art capable of emitting radiation in the infrared, visible and/or ultraviolet portions of the electromagnetic spectrum. In embodiments, the pump source 110 may include two or more light sources. In embodiments, the pump source 110 may include two or more lasers.

The light collector element 114 may include any light collector element known in the art of plasma production. For example, the light collector element 114 may include one or more elliptical reflectors, one or more spherical reflectors, and/or one or more parabolic reflectors. The light collector element 114 may be configured to collect any wavelength of broadband light from the plasma 106 known in the art of plasma-based broadband light sources. For example, the light collector element 114 may be configured to collect infrared, visible, UV, NUV, VUV and/or DUV light from the plasma 106.

The generation of a light-sustained plasma is also generally described in U.S. Pat. No. 7,435,982, issued on Oct. 14, 2008, which is incorporated by reference herein in the entirety. The generation of plasma is also generally described in U.S. Pat. No. 7,786,455, issued on Aug. 31, 2010, which is incorporated by reference herein in the entirety. The generation of plasma is also generally described in U.S. Pat. No. 7,989,786, issued on Aug. 2, 2011, which is incorporated by reference herein in the entirety. The generation of plasma is also generally described in U.S. Pat. No. 8,182,127, issued on May 22, 2012, which is incorporated by reference herein in the entirety. The generation of plasma is also generally described in U.S. Pat. No. 8,309,943, issued on Nov. 13, 2012, which is incorporated by reference herein in the entirety. The generation of plasma is also generally described in U.S. Pat. No. 8,525,138, issued on Feb. 9, 2013, which is incorporated by reference herein in the entirety. The generation of plasma is also generally described in U.S. Pat. No. 8,921,814, issued on Dec. 30, 2014, which is incorporated by reference herein in the entirety. The generation of plasma is also generally described in U.S. Pat. No. 9,318,311, issued on Apr. 19, 2016, which is incorporated by reference herein in the entirety. The generation of plasma is also generally described in U.S. Pat. No. 9,390,902, issued on Jul. 12, 2016, which is incorporated by reference herein in the entirety. In a general sense, the various embodiments of the present disclosure should be interpreted to extend to any plasma-based light source known in the art.

Figure 4:
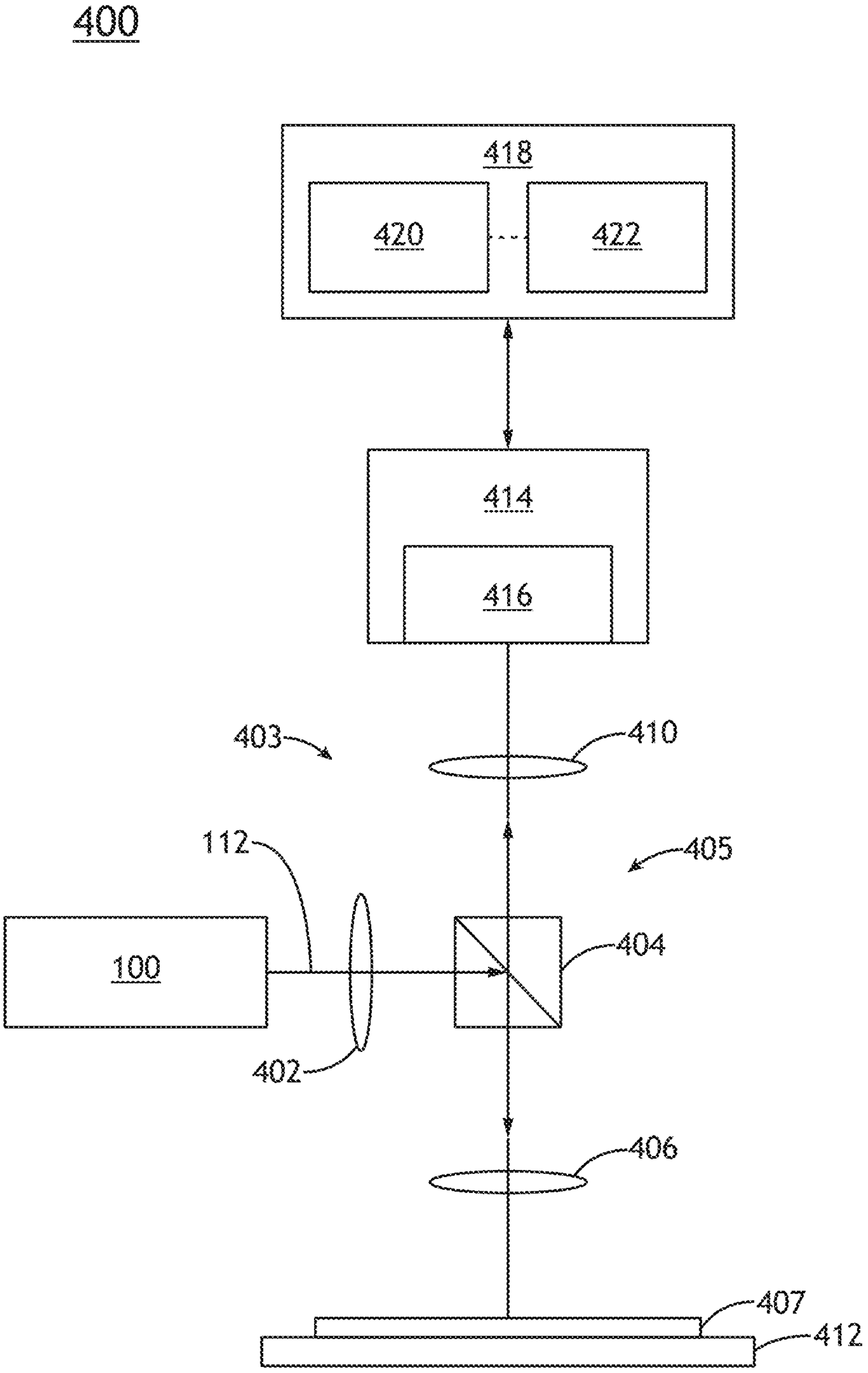
FIG. 4 is a simplified schematic illustration of an optical characterization system implementing the LSP broadband light source illustrated in any of FIGS. 1 through 3, in accordance with one or more embodiments of the present disclosure.

FIG. 4 is a schematic illustration of an optical characterization system 400 implementing the LSP broadband light source 100 illustrated in any of FIGS. 1 through 3 (or any combination thereof), in accordance with one or more embodiments of the present disclosure.

It is noted herein that the system 400 may comprise any imaging, inspection, metrology, lithography, or other characterization/fabrication system known in the art. In this regard, the system 400 may be configured to perform inspection, optical metrology, lithography, and/or imaging on a sample 407. The sample 407 may include any sample known in the art including, but not limited to, a wafer, a reticle/photomask, and the like. It is noted that the system 400 may incorporate one or more of the various embodiments of the LSP broadband light source 100 described throughout the present disclosure.

In embodiments, the sample 407 is disposed on a stage assembly 412 to facilitate movement of the sample 407. The stage assembly 412 may include any stage assembly 412 known in the art including, but not limited to, an X-Y stage, an R-θ stage, and the like. In embodiments, the set of illumination optics 403 is configured to direct illumination from the broadband light source 100 to the sample 407. The set of illumination optics 403 may include any number and type of optical components known in the art. In embodiments, the set of illumination optics 403 includes one or more optical elements such as, but not limited to, one or more lenses 402, a beam splitter 404, and an objective lens 406. In this regard, the set of illumination optics 403 may be configured to focus illumination from the LSP broadband light source 100 onto the surface of the sample 407. In embodiments, the set of collection optics 405 is configured to collect light reflected, scattered, diffracted, and/or emitted from the sample 407. In embodiments, the set of collection optics 405, such as, but not limited to, a focusing lens 410, may direct and/or focus the light from the sample 407 to a sensor 416 of a detector assembly 414. It is noted that sensor 416 and detector assembly 414 may include any sensor and detector assembly known in the art. For example, the sensor 416 may include, but is not limited to, a charge-coupled device (CCD) detector, a complementary metal-oxide semiconductor (CMOS) detector, a time-delay integration (TDI) detector, a photomultiplier tube (PMT), an avalanche photodiode (APD), and the like. Further, the sensor 416 may include, but is not limited to, a line sensor or an electron-bombarded line sensor.

In embodiments, the detector assembly 414 is communicatively coupled to a controller 418 including one or more processors 420 and a memory medium 422. For example, the one or more processors 420 may be communicatively coupled to memory 422, wherein the one or more processors 420 are configured to execute a set of program instructions stored on memory 422. In embodiments, the one or more processors 420 are configured to analyze the output of the detector assembly 414. In embodiments, the set of program instructions are configured to cause the one or more processors 420 to analyze one or more characteristics of the sample 407. In embodiments, the set of program instructions are configured to cause the one or more processors 420 to modify one or more characteristics of the system 400 in order to maintain focus on the sample 407 and/or the sensor 416. For example, the one or more processors 420 may be configured to adjust the objective lens 406 or one or more optical elements in order to focus illumination from the LSP broadband light source 100 onto the surface of the sample 407. By way of another example, the one or more processors 420 may be configured to adjust the objective lens 406 and/or one or more optical elements 402 in order to collect illumination from the surface of the sample 407 and focus the collected illumination on the sensor 416.

It is noted that the system 400 may be configured in any optical configuration known in the art including, but not limited to, a dark-field configuration, a bright-field orientation, and the like.

Figure 5:
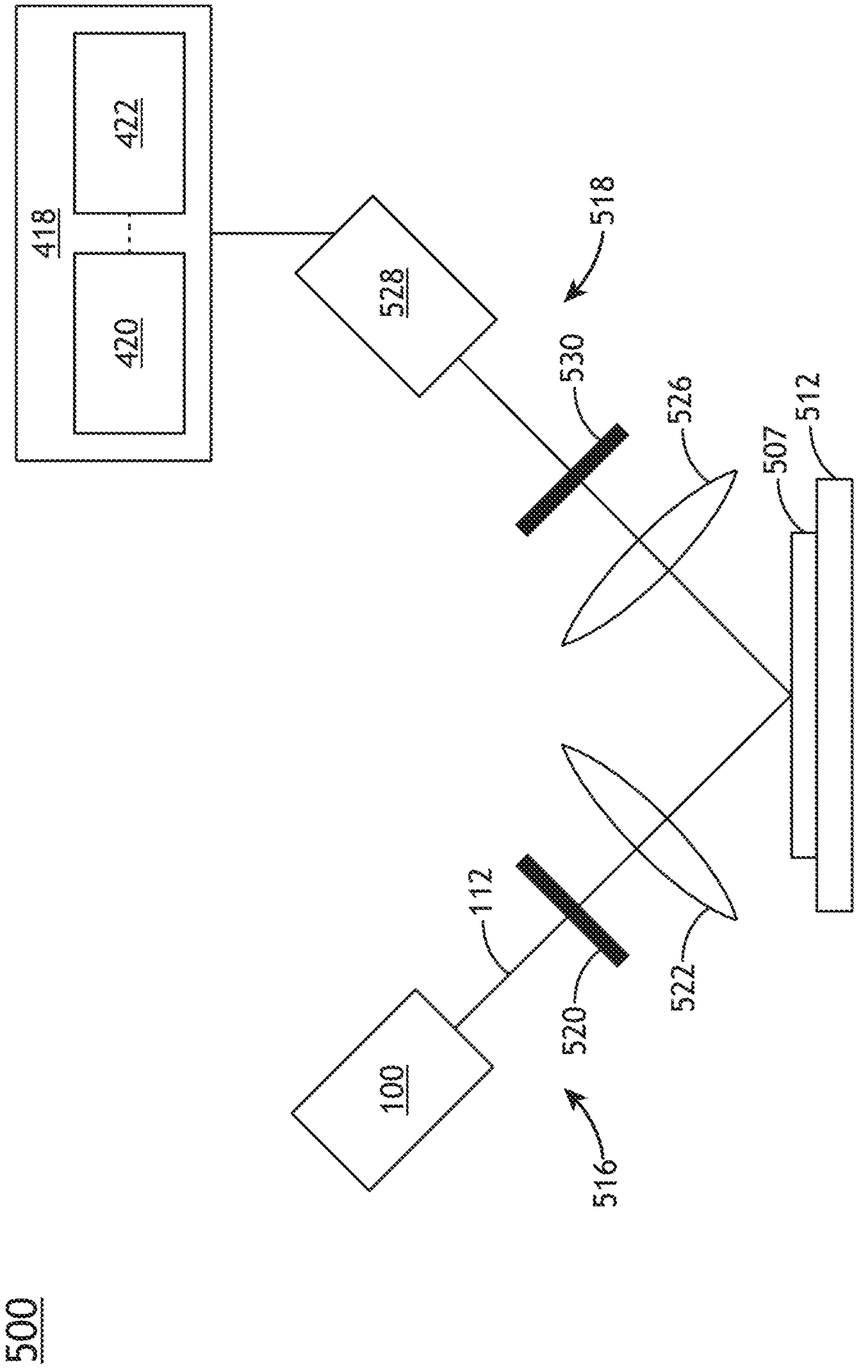
FIG. 5 is a simplified schematic illustration of an optical characterization system implementing an the LSP broadband light source illustrated in any of FIGS. 1 through 3, in accordance with one or more embodiments of the present disclosure.

FIG. 5 illustrates a simplified schematic diagram of an optical characterization system 500 arranged in a reflectometry and/or ellipsometry configuration, in accordance with one or more embodiments of the present disclosure. It is noted that the various embodiments and components described with respect to FIGS. 1 through 4 may be interpreted to extend to the system of FIG. 5 and vice-versa. The system 500 may include any type of metrology system known in the art.

In embodiments, the system 500 includes the LSP broadband light source 100, a set of illumination optics 516, a set of collection optics 518, a detector assembly 528, and the controller 418.

In this embodiment, the broadband illumination from the LSP broadband light source 100 is directed to the sample 507 via the set of illumination optics 516. In embodiments, the system 500 collects illumination emanating from the sample 507 via the set of collection optics 518. The set of illumination optics 516 may include one or more beam conditioning components 520 suitable for modifying and/or conditioning the broadband beam. For example, the one or more beam conditioning components 520 may include, but are not limited to, one or more polarizers, one or more filters, one or more beam splitters, one or more diffusers, one or more homogenizers, one or more apodizers, one or more beam shapers, or one or more lenses. In embodiments, the set of illumination optics 516 may utilize a first focusing element 522 to focus and/or direct the beam onto the sample 507 disposed on the sample stage 512. In embodiments, the set of collection optics 518 may include a second focusing element 526 to collect illumination from the sample 507.

In embodiments, the detector assembly 528 is configured to capture illumination emanating from the sample 507 through the set of collection optics 518. For example, the detector assembly 528 may receive illumination reflected or scattered (e.g., via specular reflection, diffuse reflection, and the like) from the sample 507. By way of another example, the detector assembly 528 may receive illumination generated by the sample 507 (e.g., luminescence associated with absorption of the beam, and the like). It is noted that detector assembly 528 may include any sensor and detector assembly known in the art. For example, the sensor may include, but is not limited to, CCD detector, a CMOS detector, a TDI detector, a PMT, an APD, and the like.

The set of collection optics 518 may further include any number of collection beam conditioning elements 530 to direct and/or modify illumination collected by the second focusing element 526 including, but not limited to, one or more lenses, one or more filters, one or more polarizers, or one or more phase plates.

The system 500 may be configured as any type of metrology tool known in the art such as, but not limited to, a spectroscopic ellipsometer with one or more angles of illumination, a spectroscopic ellipsometer for measuring Mueller matrix elements (e.g., using rotating compensators), a single-wavelength ellipsometer, an angle-resolved ellipsometer (e.g., a beam-profile ellipsometer), a spectroscopic reflectometer, a single-wavelength reflectometer, an angle-resolved reflectometer (e.g., a beam-profile reflectometer), an imaging system, a pupil imaging system, a spectral imaging system, or a scatterometer.

Figure 6:
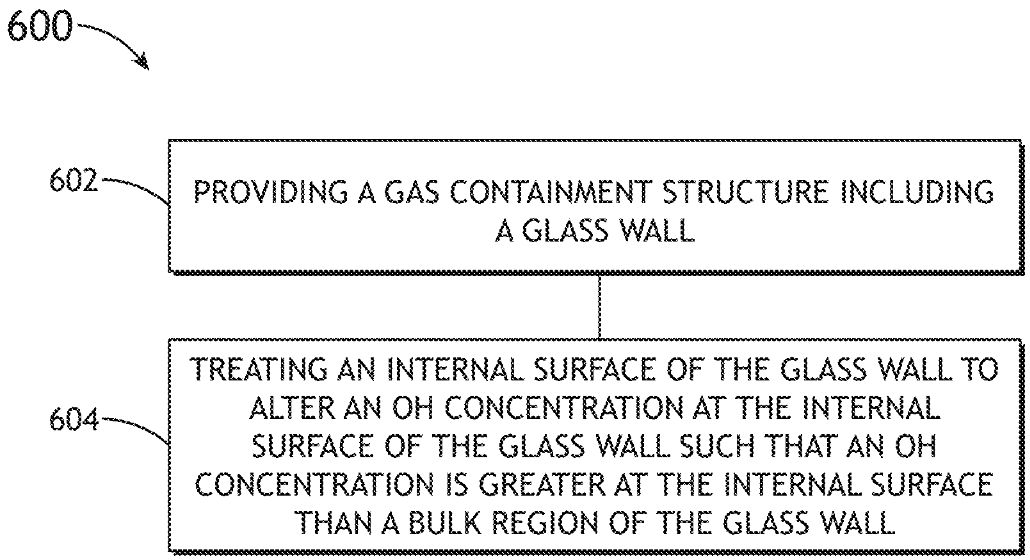
FIG. 6 illustrates a flow diagram depicting a method of forming a plasma lamp with varying OH content, in accordance with one or more embodiments of the present disclosure.

FIG. 6 illustrates a flow diagram depicting a method 600 of forming a plasma lamp with varying OH content, in accordance with one or more embodiments of the present disclosure. In step 602, a gas containment structure including a glass wall (e.g., fused silica glass) is provided. In step 604, an internal surface of the glass wall of the gas containment structure is treated to alter an OH concentration at the internal surface such that a first OH concentration at the internal surface is greater than a second OH concentration within a bulk region of the glass wall. The glass treatment may include, but is not limited to, high-temperature glass annealing in atmosphere containing water vapor.

It is further contemplated that each of the embodiments of the method described above may include any other step(s) of any other method(s) described herein. In addition, each of the embodiments of the method described above may be performed by any of the systems described herein One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like).

In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A plasma lamp comprising:

a gas containment structure configured to contain a gas and generate a plasma within the gas containment structure, the gas containment structure formed from a glass material at least partially transparent to illumination from a pump laser and at least a portion of broadband radiation emitted by the plasma, wherein the gas containment structure includes a glass wall, wherein the glass wall includes an OH concentration distribution that varies gradually through the bulk region of the glass wall.

2. The plasma lamp of claim 1, wherein a first OH concentration at an internal surface of the glass wall is higher than a second OH concentration within a bulk region of the glass wall.

3. The plasma lamp of claim 2, wherein the internal surface comprises a surface layer having an OH concentration higher than an OH concentration of the bulk region of the glass wall.

4. The plasma lamp of claim 3, wherein the internal surface has an OH content higher than 600 ppm and the bulk region has an OH content lower than 300 pm.

5. The plasma lamp of claim 3, wherein the surface layer is formed by a surface treatment that impregnates the internal surface of the glass wall with at least one of OH or $H_2$.

6. The plasma lamp of claim 3, wherein the surface layer is between 1 nm and 100 μm.

7. The plasma lamp of claim 2, wherein the first OH concentration at the internal surface of the glass wall inhibits surface degradation.

8. A laser-sustained plasma light source comprising:

a gas containment structure configured to contain a volume of gas, wherein the gas containment structure includes a glass wall, wherein the glass wall includes an OH concentration distribution that varies gradually through the bulk region of the glass wall;

a laser pump source configured to generate an optical pump to sustain a plasma within the plasma bulb; and a light collector element configured to collect at least a portion of broadband light emitted from the plasma, the gas containment structure formed from a glass material at least partially transparent to illumination from the laser pump source and at least a portion of broadband radiation emitted by the plasma.

9. The laser-sustained plasma light source of claim 8, wherein a first OH concentration at an internal surface of the glass wall is higher than a second OH concentration within a bulk region of the glass wall.

10. The laser-sustained plasma light source of claim 9, wherein the internal surface comprises a surface layer having an OH concentration higher than the bulk region of the glass wall.

11. The laser-sustained plasma light source of claim 10, wherein the internal surface has an OH content higher than 600 ppm and the bulk region has an OH content lower than 300 pm.

12. The laser-sustained plasma light source of claim 10, wherein the surface layer is formed by a surface treatment that impregnates the internal surface of the glass wall with at least one of OH or $H_2$.

13. The laser-sustained plasma light source of claim 10, wherein the surface layer is between 1 nm and 100 μm.

14. The laser-sustained plasma light source of claim 9, wherein the first OH concentration at the internal surface of the glass wall inhibits surface degradation.

15. A characterization system comprising:

a laser-sustained light source comprising:

a gas containment structure configured to contain a volume of gas, wherein the gas containment structure includes a glass wall, wherein the glass wall includes an OH concentration distribution that varies gradually through the bulk region of the glass wall;

a laser pump source configured to generate an optical pump to sustain a plasma within the gas containment structure;

a light collector element configured to collect at least a portion of broadband light emitted from the plasma, the gas containment structure formed from a glass material at least partially transparent to illumination from the laser pump source and at least a portion of broadband radiation emitted by the plasma;

a set of illumination optics configured to direct broadband light from the laser-sustained light source to one or more samples;

a set of collection optics configured to collect light emanating from the one or more samples; and a detector assembly.

16. A method of forming a plasma lamp comprising:

providing a gas containment structure, the gas containment structure including a glass wall; and coating an internal surface of the glass wall with one or more chemical precursors to alter an OH concentration at the internal surface such that a first OH concentration at the internal surface is greater than a second OH concentration within the bulk region of the glass wall.

17. The method of forming a plasma lamp of claim 16, wherein the treating the internal surface of the glass wall of the gas containment structure to alter the OH concentration at the internal surface such that the first OH concentration at the internal surface is greater than the second OH concentration within the bulk region of the glass wall comprises:

annealing the plasma lamp at elevated temperature in the presence of water vapor to alter the OH concentration at the internal surface such that the first OH concentration at the internal surface is greater than the second OH concentration within the bulk region of the glass wall.

18. A method of forming a plasma lamp comprising:

providing a gas containment structure, the gas containment structure including a glass wall; and treating an internal surface of the glass wall of the gas containment structure to alter an OH concentration at the internal surface such that a first OH concentration at the internal surface is greater than a second OH concentration within a bulk region of the glass wall, wherein the OH concentration distribution varies gradually through the bulk region of the glass wall.

* * * * *